United States Patent
Reynolds et al.

(10) Patent No.: US 9,438,493 B2
(45) Date of Patent: Sep. 6, 2016

(54) MONITORING NETWORK ENTITIES VIA A CENTRAL MONITORING SYSTEM

(71) Applicant: Go Daddy Operating Company, LLC, Scottsdale, AZ (US)

(72) Inventors: Daymion Reynolds, Phoenix, AZ (US); Jeff Mink, Tempe, AZ (US); Craig Condit, Scottsdale, AZ (US); Chris Boltz, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 503 days.

(21) Appl. No.: 13/756,316

(22) Filed: Jan. 31, 2013

(65) Prior Publication Data
US 2014/0215055 A1   Jul. 31, 2014

(51) Int. Cl.
*H04L 12/26* (2006.01)
*H04L 12/24* (2006.01)

(52) U.S. Cl.
CPC .............. *H04L 43/08* (2013.01); *H04L 41/06* (2013.01); *H04L 43/022* (2013.01)

(58) Field of Classification Search
CPC ...... G06Q 10/10; G06Q 40/00; G06Q 50/22; G06Q 30/02; G06Q 10/063112; G06Q 10/06314; G06Q 10/06398; G06Q 10/1093; G06Q 20/3829; G06Q 40/04; G06Q 40/06; G06Q 30/026; G06Q 30/0277; G06Q 30/00; G06Q 30/08; G06Q 30/0201; G06Q 30/06; G06Q 10/00; G06Q 10/06; G06Q 10/063; G06Q 10/0635; G06Q 10/0637; G06Q 10/06393; G06Q 20/40; G06Q 30/0207; G06Q 30/0209; G06Q 30/023; G06Q 30/0241; G06Q 30/0254; G06Q 30/0256; G06Q 30/0275; G06Q 30/0279; G06Q 40/02; G06Q 50/34; H04L 29/12141; H04L 41/0233; H04L 41/0663; H04L 41/0843; H04L 41/0856; H04L 41/0893; H04L 41/5041; H04L 41/5058; H04L 61/1558; H04L 67/02; H04L 67/34; H04L 67/42; H04L 41/0672; H04L 67/1002; H04L 67/101; H04L 67/1012; H04L 67/1029; H04L 67/22; H04L 67/306; H04L 61/1511; H04L 61/302; H04L 67/1008; H04L 67/125; H04L 69/329; H04L 12/16; H04L 12/1822; H04L 12/1877; H04L 12/666; H04L 29/06; H04L 41/12; H04L 43/04; H04L 43/065; H04L 43/0817; H04L 43/087; H04L 43/10; H04L 43/16; H04L 45/00; H04L 45/54; H04L 47/70; H04L 51/043; H04L 63/126; H04L 63/1441; H04L 65/1083; H04L 65/4061; H04L 65/4084; H04L 65/601; H04L 65/602; H04L 65/607; H04L 65/608; H04L 67/06; H04L 67/10; H04L 67/1004; H04L 67/1034; H04L 67/1036; H04L 67/1095; H04L 67/16; H04L 67/24; H04L 69/24; H04L 69/28
See application file for complete search history.

(56) References Cited

U.S. PATENT DOCUMENTS 5,426,594 A  6/1995  Wright et al.
5,771,354 A  6/1998  Crawford
(Continued)

FOREIGN PATENT DOCUMENTS

WO   2007052285   5/2007

OTHER PUBLICATIONS

QuackIT; "Cold Fusion Administration"; Oct. 14, 2007; QuackIT.com; pp. 1-3.
(Continued)

*Primary Examiner* — Backhean Tiv
(74) *Attorney, Agent, or Firm* — Quarles & Brady LLP (57) ABSTRACT

Systems and method of the present invention provide for one or more server computers configured to receive a plurality of data published by a network entity and identify, within the data: the network entity that published the data, a sample of one or more metrics for the network entity and a sample type of each of the one or more samples. The one or more server computers may further be configured to calculate a network resource usage score, using the one or more metrics according to one or more rules for each of the sample types identified, for the sample.

19 Claims, 3 Drawing Sheets

(56) References Cited

U.S. PATENT DOCUMENTS

| | | |
|---|---|---|
| 5,774,660 A | 6/1998 | Brendel et al. |
| 5,870,550 A | 2/1999 | Wesinger et al. |
| 5,872,848 A | 2/1999 | Romney et al. |
| 5,901,228 A | 5/1999 | Crawford |
| 6,003,030 A | 12/1999 | Kenner et al. |
| 6,012,066 A | 1/2000 | Discount et al. |
| 6,070,190 A * | 5/2000 | Reps .............. G06F 11/3495 709/203 |
| 6,108,703 A | 8/2000 | Leighton et al. |
| 6,151,631 A | 11/2000 | Ansell et al. |
| 6,263,447 B1 | 7/2001 | French et al. |
| 6,308,275 B1 | 10/2001 | Vaswani et al. |
| 6,393,482 B1 | 5/2002 | Rai et al. |
| 6,400,722 B1 | 6/2002 | Chuah et al. |
| 6,411,943 B1 | 6/2002 | Crawford |
| 6,553,413 B1 | 4/2003 | Leighton et al. |
| 6,598,077 B2 | 7/2003 | Primak et al. |
| 6,625,643 B1 | 9/2003 | Colby et al. |
| 6,629,136 B1 | 9/2003 | Naidoo |
| 6,647,422 B2 | 11/2003 | Wesinger et al. |
| 6,654,804 B1 | 11/2003 | Fleming, III |
| 6,675,208 B1 | 1/2004 | Rai et al. |
| 6,757,740 B1 | 6/2004 | Parekh et al. |
| 6,788,315 B1 * | 9/2004 | Kekic ................ H04L 41/0681 709/203 |
| 6,789,103 B1 | 9/2004 | Kim et al. |
| 6,829,230 B1 | 12/2004 | Tiuri |
| 6,842,769 B1 | 1/2005 | Kim et al. |
| 6,868,444 B1 * | 3/2005 | Kim et al. ................. 709/223 |
| 6,888,836 B1 | 5/2005 | Cherkasova |
| 6,996,609 B2 | 2/2006 | Hickman et al. |
| 7,051,098 B2 * | 5/2006 | Masters ................... G06F 9/06 709/223 |
| 7,080,051 B1 | 7/2006 | Crawford |
| 7,111,072 B1 | 9/2006 | Matthews et al. |
| 7,117,504 B2 | 10/2006 | Smith et al. |
| 7,139,840 B1 | 11/2006 | O'Toole |
| 7,149,892 B2 | 12/2006 | Freed et al. |
| 7,197,545 B1 | 3/2007 | Davie |
| 7,225,248 B1 | 5/2007 | Osburn, III |
| 7,233,978 B2 | 6/2007 | Overton et al. |
| 7,359,935 B1 | 4/2008 | Karipides et al. |
| 7,369,996 B2 | 5/2008 | Sladden |
| 7,373,500 B2 | 5/2008 | Ramelson et al. |
| 7,383,327 B1 | 6/2008 | Tormasov et al. |
| 7,386,880 B2 | 6/2008 | Wesinger et al. |
| 7,392,321 B1 | 6/2008 | Wolf et al. |
| 7,414,981 B2 | 8/2008 | Jaramillo et al. |
| 7,430,598 B2 * | 9/2008 | Raden et al. ............... 709/224 |
| 7,433,710 B2 | 10/2008 | Bodnar et al. |
| 7,454,457 B1 | 11/2008 | Lowery et al. |
| 7,466,672 B2 * | 12/2008 | Van Der Burg .... H04M 3/2254 370/252 |
| 7,487,546 B1 | 2/2009 | Szor |
| 7,506,010 B2 | 3/2009 | Kulkarni et al. |
| 7,590,073 B2 | 9/2009 | Beckmann et al. |
| 7,599,847 B2 | 10/2009 | Block et al. |
| 7,644,117 B2 | 1/2010 | Zimmerman et al. |
| 7,647,387 B2 | 1/2010 | Bellare et al. |
| 7,649,854 B2 | 1/2010 | Piper |
| 7,716,367 B1 | 5/2010 | Leighton et al. |
| 7,783,540 B2 | 8/2010 | Davis et al. |
| 7,804,982 B2 | 9/2010 | Howard et al. |
| 7,805,379 B1 | 9/2010 | Adkins, III et al. |
| 7,941,510 B1 | 5/2011 | Tormasov et al. |
| 7,987,262 B2 | 7/2011 | Tung et al. |
| 8,024,578 B2 | 9/2011 | Geosimonian |
| 8,176,095 B2 * | 5/2012 | Murray et al. ................. 707/805 |
| 8,650,271 B2 * | 2/2014 | McCardle ........... G06F 11/3495 345/501 |
| 2001/0001854 A1 | 5/2001 | Schena |
| 2001/0011304 A1 | 8/2001 | Wesinger et al. |
| 2001/0046227 A1 | 11/2001 | Matsuhira et al. |
| 2002/0035611 A1 | 3/2002 | Dooley |
| 2002/0042693 A1 * | 4/2002 | Kampe ............... H04L 12/2602 702/186 |
| 2002/0042719 A1 | 4/2002 | Chauchard et al. |
| 2002/0073235 A1 | 6/2002 | Chen et al. |
| 2002/0087643 A1 | 7/2002 | Parsons et al. |
| 2002/0143564 A1 | 10/2002 | Webb et al. |
| 2002/0143664 A1 | 10/2002 | Webb |
| 2002/0147790 A1 | 10/2002 | Snow |
| 2002/0152224 A1 | 10/2002 | Roth et al. |
| 2003/0005287 A1 | 1/2003 | Wray et al. |
| 2003/0009594 A1 | 1/2003 | McElligott |
| 2003/0069953 A1 * | 4/2003 | Bottom ............... H04L 41/0681 709/223 |
| 2003/0069991 A1 | 4/2003 | Brescia |
| 2003/0078894 A1 | 4/2003 | Kon |
| 2003/0078962 A1 | 4/2003 | Fabbricatore et al. |
| 2003/0101278 A1 | 5/2003 | Garcia-Luna-Aceves et al. |
| 2003/0120502 A1 | 6/2003 | Robb et al. |
| 2003/0200305 A1 * | 10/2003 | Tarby ....................... H04L 29/06 709/224 |
| 2003/0229900 A1 | 12/2003 | Reisman |
| 2004/0039906 A1 | 2/2004 | Oka et al. |
| 2004/0083307 A1 | 4/2004 | Uysal |
| 2004/0088422 A1 | 5/2004 | Flynn et al. |
| 2004/0133440 A1 | 7/2004 | Carolan et al. |
| 2004/0136379 A1 * | 7/2004 | Liao et al. ................. 370/395.21 |
| 2004/0148229 A1 | 7/2004 | Maxwell |
| 2004/0167858 A1 | 8/2004 | Erickson |
| 2004/0186778 A1 | 9/2004 | Margiloff et al. |
| 2004/0210663 A1 | 10/2004 | Phillips et al. |
| 2005/0038658 A1 | 2/2005 | Sladden |
| 2005/0091361 A1 * | 4/2005 | Bernstein ................ H04L 41/12 709/223 |
| 2005/0102382 A1 * | 5/2005 | MacGregor et al. ......... 709/223 |
| 2005/0105513 A1 | 5/2005 | Sullivan et al. |
| 2005/0114541 A1 | 5/2005 | Ghetie et al. |
| 2005/0134896 A1 | 6/2005 | Koga |
| 2005/0228881 A1 | 10/2005 | Reasor et al. |
| 2005/0239447 A1 | 10/2005 | Holzman et al. |
| 2005/0243972 A1 * | 11/2005 | McKinnel ........... H04L 21/2602 379/32.01 |
| 2005/0283753 A1 * | 12/2005 | Ho et al. ..................... 717/102 |
| 2006/0047725 A1 | 3/2006 | Bramson |
| 2006/0100912 A1 | 5/2006 | Kumar et al. |
| 2006/0126201 A1 | 6/2006 | Jain |
| 2006/0129635 A1 | 6/2006 | Baccou et al. |
| 2006/0139312 A1 | 6/2006 | Sinclair et al. |
| 2006/0193333 A1 | 8/2006 | Baughan et al. |
| 2006/0198322 A1 | 9/2006 | Hares |
| 2006/0200527 A1 | 9/2006 | Woods |
| 2006/0206547 A1 | 9/2006 | Kulkarni et al. |
| 2006/0236254 A1 | 10/2006 | Mateescu et al. |
| 2006/0245433 A1 | 11/2006 | Berg et al. |
| 2007/0021971 A1 | 1/2007 | McKinney et al. |
| 2007/0027985 A1 * | 2/2007 | Ramany ................. H04L 67/125 709/224 |
| 2007/0038755 A1 | 2/2007 | Sullivan et al. |
| 2007/0061462 A1 | 3/2007 | Kim et al. |
| 2007/0061465 A1 | 3/2007 | Kim et al. |
| 2007/0094411 A1 | 4/2007 | Mullane et al. |
| 2007/0150363 A1 | 6/2007 | Patrawala |
| 2007/0150581 A1 * | 6/2007 | Banerjee ................. H04L 41/22 709/224 |
| 2007/0153691 A1 | 7/2007 | Halpern |
| 2007/0174237 A1 | 7/2007 | Wilbrink et al. |
| 2007/0174635 A1 | 7/2007 | Jones |
| 2007/0180436 A1 | 8/2007 | Travostino et al. |
| 2007/0192493 A1 | 8/2007 | Manolache et al. |
| 2007/0198724 A1 | 8/2007 | Hawkinson et al. |
| 2007/0198946 A1 | 8/2007 | Viji et al. |
| 2007/0219875 A1 | 9/2007 | Toulotte |
| 2007/0225962 A1 | 9/2007 | Brunet et al. |
| 2007/0283005 A1 | 12/2007 | Beliles et al. |
| 2007/0291739 A1 | 12/2007 | Sullivan et al. |
| 2008/0005312 A1 | 1/2008 | Boss et al. |
| 2008/0010139 A1 | 1/2008 | Elmer et al. |
| 2008/0019359 A1 | 1/2008 | Droux et al. |
| 2008/0046340 A1 | 2/2008 | Brown |
| 2008/0052384 A1 | 2/2008 | Marl et al. |

(56) References Cited

U.S. PATENT DOCUMENTS

| | | |
|---|---|---|
| 2008/0059607 A1 | 3/2008 | Schneider |
| 2008/0071883 A1 | 3/2008 | Alterman |
| 2008/0104276 A1* | 5/2008 | Lahoti et al. ............... 709/245 |
| 2008/0120617 A1 | 5/2008 | Keller et al. |
| 2008/0126232 A1 | 5/2008 | Lee |
| 2008/0141237 A1 | 6/2008 | Elad et al. |
| 2008/0147856 A1 | 6/2008 | Lee et al. |
| 2008/0177994 A1 | 7/2008 | Mayer |
| 2008/0182561 A1 | 7/2008 | Kim et al. |
| 2008/0201402 A1* | 8/2008 | Petrilli ............... H04L 41/042 709/202 |
| 2008/0201410 A1 | 8/2008 | Adelman et al. |
| 2008/0201413 A1 | 8/2008 | Sullivan et al. |
| 2008/0201421 A1 | 8/2008 | Adelman et al. |
| 2008/0201466 A1 | 8/2008 | Adelman et al. |
| 2008/0201473 A1 | 8/2008 | Adelman et al. |
| 2008/0229430 A1 | 9/2008 | Kargman |
| 2008/0235289 A1 | 9/2008 | Carnes et al. |
| 2008/0243536 A1 | 10/2008 | Dworkin et al. |
| 2008/0243634 A1 | 10/2008 | Dworkin et al. |
| 2008/0256553 A1 | 10/2008 | Cullen |
| 2008/0270418 A1 | 10/2008 | Chen et al. |
| 2008/0282338 A1 | 11/2008 | Beer |
| 2008/0288300 A1 | 11/2008 | Emling et al. |
| 2008/0294479 A1 | 11/2008 | Emling et al. |
| 2008/0294768 A1 | 11/2008 | Sampson et al. |
| 2008/0307425 A1* | 12/2008 | Tripathi ............... G06F 9/5077 718/104 |
| 2009/0007229 A1 | 1/2009 | Stokes |
| 2009/0016522 A1 | 1/2009 | Torres et al. |
| 2009/0042537 A1 | 2/2009 | Gelbman et al. |
| 2009/0048712 A1 | 2/2009 | Rosenblum |
| 2009/0055506 A1 | 2/2009 | Hudson et al. |
| 2009/0094379 A1 | 4/2009 | Lu et al. |
| 2009/0132487 A1 | 5/2009 | Lev |
| 2009/0150527 A1 | 6/2009 | Tripathi et al. |
| 2009/0157882 A1 | 6/2009 | Kashyap |
| 2009/0248595 A1 | 10/2009 | Lu et al. |
| 2009/0254610 A1 | 10/2009 | Arthursson |
| 2009/0272799 A1 | 11/2009 | Skor et al. |
| 2009/0276771 A1 | 11/2009 | Nickolov et al. |
| 2009/0300407 A1 | 12/2009 | Kamath et al. |
| 2009/0313320 A1 | 12/2009 | Parsons et al. |
| 2009/0313321 A1 | 12/2009 | Parsons et al. |
| 2009/0313363 A1 | 12/2009 | Parsons et al. |
| 2009/0313364 A1 | 12/2009 | Parsons et al. |
| 2010/0027420 A1 | 2/2010 | Smith |
| 2010/0106691 A1 | 4/2010 | Preslan et al. |
| 2010/0114739 A1 | 5/2010 | Johnston |
| 2010/0125473 A1 | 5/2010 | Tung et al. |
| 2010/0306122 A1 | 12/2010 | Shaffer et al. |
| 2010/0306267 A1 | 12/2010 | Zamkoff et al. |
| 2010/0332456 A1 | 12/2010 | Prahlad et al. |
| 2010/0332818 A1 | 12/2010 | Prahlad |
| 2010/0333116 A1 | 12/2010 | Prahlad et al. |
| 2011/0055249 A1 | 3/2011 | Consuegra et al. |
| 2011/0087690 A1 | 4/2011 | Cairns |
| 2011/0093769 A1 | 4/2011 | Dunn et al. |
| 2011/0103393 A1* | 5/2011 | Meier et al. ............... 370/401 |
| 2011/0161291 A1 | 6/2011 | Taleck et al. |
| 2011/0185082 A1* | 7/2011 | Thompson ............ H04W 4/003 709/238 |
| 2012/0023429 A1* | 1/2012 | Medhi ............... G06F 11/323 715/772 |
| 2012/0041842 A1 | 2/2012 | Adelman et al. |
| 2012/0053925 A1* | 3/2012 | Geffin et al. ............... 703/21 |
| 2012/0096065 A1* | 4/2012 | Suit ............... H04L 12/6418 709/202 |
| 2012/0114191 A1 | 5/2012 | Bladel et al. |
| 2012/0115433 A1* | 5/2012 | Young et al. ............... 455/406 |
| 2012/0284221 A1* | 11/2012 | Shelton et al. ............... 706/47 |
| 2013/0047039 A1* | 2/2013 | Manes et al. ............... 714/47.1 |
| 2014/0006597 A1* | 1/2014 | Ganguli ............... G06F 9/5072 709/224 |
| 2014/0136589 A1* | 5/2014 | Wahler ............ H04L 29/08144 709/201 |
| 2014/0173712 A1* | 6/2014 | Ferdinand et al. ............... 726/11 |

OTHER PUBLICATIONS

Cisco; "Configuring Virtual Interfaces"; May 2, 2005; excerpt from Cisco IOS Interface and Hardware Component Configuration Guide; pp. 1-12.

Cisco01; "Chapter 7: Configuring Switches"; Apr. 14, 2008; www.Cisco.com; pp. 1-9.

Microsoft01; "Static routing design considerations"; Jan. 21, 2005; www.microsoft.com; pp-1-2.

Solaris03; "System Administration Guide: Solaris Containers—Resource Management and Solaris Zones"; Jan. 2005; Sun Microsystems Inc; pp. 1-334.

Peterson, cPanel User Guide and Tutorial, Packt Publishing, All, Mar. 2006.

Getting Started with Windows Shared Hosting, Version 2.1, Apr. 9, 2007.

Plesk 8.3 for Windows Administrator's Guide, SWsoft Holdings, Ltd, Revision 1.0, 2007, All Pages.

PHP-Nuke: Management and Programming, Revision 2.1, 2005, All Pages.

Microsoft looks ahead, Magazine, eWeek, Mar. 3, 2008, pp. 14-15.

Getting Started with Linux Shared Hosting, Dec. 7, 2006.

IBM Cloud Computing Version 1.0, Oct. 8, 2007.

About MogileFS http://www.danga.com/mogilefs/.

Zenel, A General Purpose Proxy Filtering Mechanism Applied to the Mobile Environment, Wireless Network, vol. 5, Issue 5, Oct. 1999, pp. 391-409.

Zenel, A General Purpose Proxy Filtering Mechanism Applied to the Mobile Environment, 1997.

Zenel, A Proxy Based Filtering Mechanism for the Mobile Environment, Doctoral Thesis, Columbia University, 1998.

Microsoft Computer Dictionary, 5th Edition, 2002, p. 383.

CertaintySolutions; "Understanding DNS: How to Register for, Configure, and Change DNS Service"; Sep. 2000; Certainty Solutions Inc; pp. 1-7.

Huang et al.; Design of Privacy-Preserving Cloud Storage Framework; Grid and Cooperative Computing (GCC), 2010 9th International; Nov. 1-5, 2010; pp. 128-132.

www.GoDaddy.com screen shot, Dec. 6, 2002.

GoDaddy.com screen shot, http://web.archive.org/web/20030401091726/www.godaddy.com/gdshop/default.asp?e=com.

\* cited by examiner

MONITORING NETWORK ENTITIES VIA A CENTRAL MONITORING SYSTEM

FIELD OF THE INVENTION

The present inventions generally relate to shared server hosting and, more particularly, systems and methods for a central software running on a server computer to monitor data published by one or more network entities reflecting their performance metrics, and to calculate scores for the network entities based on these metrics.

SUMMARY OF THE INVENTION

An example embodiment of a method of monitoring one or more network entities using a central monitoring system may comprise the steps of one or more server computers receiving a plurality of data published by one or more network entities, and identifying, within the plurality of data: the network entity that published the data, one or more samples of one or more metrics for each of the one or more network entities, and a sample type of each of the one or more samples. Additional steps may include the one or more server computers calculating one or more network resource usage scores, using the one or more metrics and according to one or more rules for the sample type identified, for each of the one or more samples.

An example embodiment of a system for monitoring one or more network entities using a central monitoring system may comprise one or more server computers communicatively coupled to a network and configured to: receive a plurality of data published by a network entity and identify, within the data: the network entity that published the data, a sample of one or more metrics for the network entity and a sample type of each of the one or more samples. The one or more server computers may further be configured to calculate a network resource usage score, using the one or more metrics according to one or more rules for each of the sample types identified, for each of the one or more samples.

The above features and advantages of the present inventions will be better understood from the following detailed description taken in conjunction with the accompanying drawings.

DETAILED DESCRIPTION

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between people or organizations that make use of network or computer resources (users). Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as websites. Websites comprise a collection of connected or otherwise related, web pages. The combination of all the websites and their corresponding web pages on the Internet is generally known as the World Wide Web (WWW) or simply the Web.

A network administrator may desire to monitor several computers, servers and/or other network nodes (nodes) within a network environment. Presently existing systems and methods may rely on each of the nodes to monitor its own performance metrics and perform all necessary algorithms to generate its own performance scores. Each node may also be responsible for monitoring these scores and generating and triggering alerts if and when the node determines a score is out of bounds of acceptable parameters.

Applicant has determined, however, that presently-existing monitoring systems and methods do not provide optimal means for monitoring performance information and to contribute to network statistics generally for nodes, clusters, other network resources and/or the users who use them (entities). In a network environment with a large number of such entities, adding, removing, or repurposing individual network resources requires changing the system configuration for each of the nodes in the network environment. Specifically, adding scores and/or changing how scores are generated requires sending an update to each node that monitors, calculates and/or uses that score. Likewise, alert behavior for each entity must be individually configured in such a monitoring system.

If an individual node is a part of a cluster of nodes that act in conjunction with one another, but the node generates and handles all of its own monitoring, scoring, alert and behavior data, then generating scores that include data from all other entities in the cluster or other node groupings is very complicated, if even possible. Presently-existing monitoring systems only generate and present scores and/or alerts on an individual entity basis, then report the findings of each individual entity. They do not compare data feeds provided by various and diverse entities and/or nodes. In other words, presently existing systems and methods have no ability to normalize and/or compare the data feeds from other nodes in the network.

Applicant has therefore determined that optimal monitoring systems and methods may improve on presently-existing monitoring systems by moving the responsibility for generating scores and alerts to a central monitoring system, possibly one or more software modules running on one or more central nodes in the network which are accessible by all nodes in the network. In such a model, the central monitoring system may have access to raw data containing network, cluster, user and/or individual entity metrics published by all nodes in a grouping of nodes and accessible via messages and/or data feeds. Using this raw data, scoring scripts may be written to use the data from all entities to calculate scores and alerts, where needed, for all network entities within the network.

Changes to the network, therefore, such as adding, removing or changing network nodes' configurations, may be implemented without needing to reconfigure the one or more software modules that calculate these scores and alerts. The software modules only consume the raw data provided by each network entity, so scoring rules need only be changed within the one or more software modules, which then apply the changes to the raw data received from any of the entities within the network.

In addition, information may be analyzed across diverse nodes and normalized accordingly. As a non-limiting example, presently existing systems and methods may calculate scores and alerts where memory utilization of an entity is measured as bytes if the node is running one operating system, but may generate scores and alerts where memory utilization of a second entity is measured in kilobytes if the node is running a second, different operating system. In presently existing methods and systems, such variations in the information makes it difficult, if not impossible, to compare the memory utilization metrics in an "apples to apples" comparison.

Applicant has therefore determined that moving responsibility for generating scores to a centralized monitoring system may allow the monitoring system to normalize the data received from the various entities to compare the values and determine how the values relate to each other. For example, the central monitoring system described herein may be configured to recognize the difference between the two operating systems, convert bytes to kilobytes or vice-versa, compare the data from diverse entities, and generate scores and/or alerts for these diverse entities.

Likewise, a central monitoring system represents a greater flexibility over presently existing systems and methods. As described herein, the raw data received from the network entities may comprise information about a type of entity or metric sample and/or the purpose of a cluster of nodes. Because a score is generated, or an alert takes action, based on the entity/sample type and/or score category, one or more nodes do not need to be configured for each entity.

Where presently existing systems and methods only comprise information about single nodes within the cluster and must be configured for each entity, a central monitoring system may use a sample type within the raw data which contains information about the purpose of the cluster to generate scores and alerts customized for specific entities and/or the purpose of the cluster and/or entities in different clusters. The score(s) and/or alert(s) may be set up to provide special handling for only those entities that are exceptional, so no flexibility is lost when monitoring and generating scores and/or alerts for diverse entities or nodes.

Methods and Systems for Monitoring Network Resources

Figure 1:
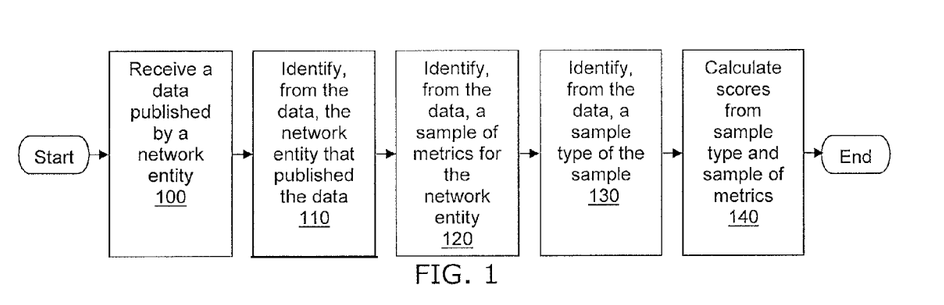
FIG. 1 is a flow diagram illustrating a possible embodiment of a method for monitoring one or more network entities using a central monitoring system.
Figure 2:
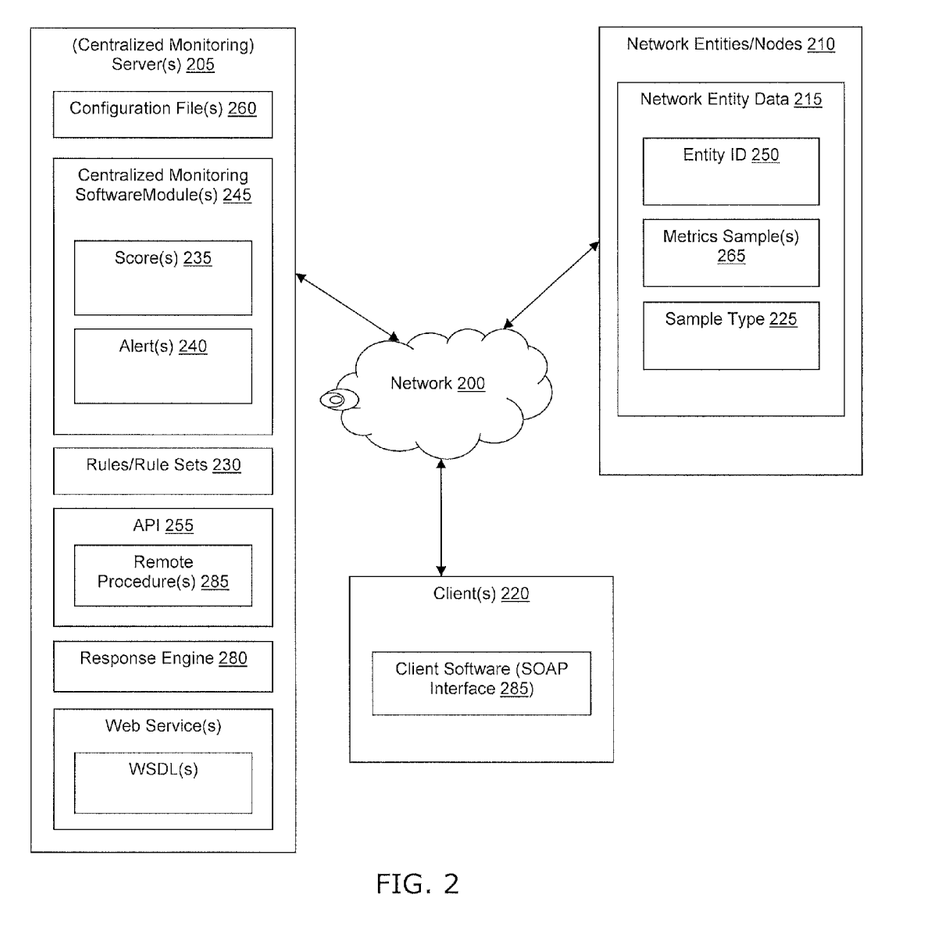
FIG. 2 illustrates a possible embodiment of a system for monitoring one or more network entities using a central monitoring system.

FIGS. 1 and 2 illustrate embodiments of a method and a system, respectively, for monitoring one or more network entities using a central monitoring system. The method embodiment may comprise the steps of one or more server computers 205, communicatively coupled to a network 200, receiving a plurality of data 215 published by one or more network entities 210 (Step 100). The server(s) 205 may then identify, within the data 215 from each of the one or more network entities 210, the network entity 210 that published the data 215 (Step 110), one or more samples 265 of one or more metrics 265 for each of the network entities 210 (Step 120) and a sample type 225 for each of the samples 265 (Step 130). The server(s) 205 may then calculate one or more network resource usage scores 235 for the sample 265 and/or entity 210 (Step 140). The network resource usage scores 235 may be calculated using one or more rules 230 applied to each of the one or more metrics 265 for each of the one or more network entities 210 and determined by the identified sample type 225.

As seen in FIG. 2, a system for monitoring one or more network entities 210 using a central monitoring system may comprise one or more central monitoring software modules (monitor module(s)) 245 running on the server(s) 205 communicatively coupled to the network 200 and configured to analyze the plurality of data 215 and create and/or apply score and alert rules 230.

The example embodiments illustrated herein place no limitation on network 200 configuration or connectivity. Thus, as non-limiting examples, the network 200 could comprise the Internet, the public switched telephone network, the global Telex network, computer networks (e.g., an intranet, an extranet, a local-area network, or a wide-area network), wired networks, wireless networks, or any combination thereof. System components may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

Any of the servers 205, 210 described herein may comprise a computer-readable storage media storing instructions that, when executed by a microprocessor, cause the server(s) 205, 210 to perform the steps for which they are configured. Such computer-readable media may comprise any data storage medium capable of storing instructions for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions may, as non-limiting examples, comprise software and/or scripts stored in the computer-readable media that may be stored locally in the server(s) or, alternatively, in a highly-distributed format in a plurality of computer-readable media accessible via the network 200, perhaps via a grid or cloud-computing environment.

Such instructions may be implemented in the form of software modules. Any software modules described herein may comprise a self-contained software component that may interact with the larger system and/or other modules. A module may comprise an individual (or plurality of) file(s) and may execute a specific task within a larger software and/or hardware system. As a non-limiting example, a module may comprise any software and/or scripts running on one or more server(s) containing instructions (perhaps stored in computer-readable media accessible by the server computer's computer processor) that, when executed by the computer processor, cause the server computer 205, 210 to perform the steps for which it is configured.

The software modules, as well as the data generated and stored, are not required to be stored and/or executed on a single computer or within a single software module. As a non-limiting example, in some embodiments, data may be stored across various applications on the central servers 205. This configuration may run functions and/or software modules such as the scoring and/or alert function(s) within the monitor module(s) 245 as service instances on multiple servers 205, each server handling a fraction of the load while ensuring that each instance of the service has access to the same data.

For example, if the scoring and/or alert functions within the monitor module(s) 245 are distributed among three servers 205, each of the three servers 205 may process scores 235 and/or alerts 240 for a third of the clusters. A non-limiting example of such a service may include the open-source project Memcache.

The plurality of data 215 received by the one or more server computers may comprise a plurality of raw data 215 monitored, generated and transmitted to and/or from one or more network entities 210, possibly using software modules configured to do so. The data 215 may be a data feed, possibly comprising network messages, which include samples of network, cluster and/or individual entity metrics 265. This data may have no intelligence on its own, meaning it has not been analyzed or had scoring, alert and/or any other algorithms performed on it. These samples 265 may include one or more point in-time samples of performance data, including the type of sample obtained 225, plus enough information to determine (at minimum): the entity identification 250 and the timestamp that the sample 265 was obtained.

The entity identification 250 for the entity 210 which monitored, generated and transmitted the plurality of data 215 may include, as non-limiting examples, an identification of a node if the sample is associated with a specific node, an identification of a plurality of related or unrelated nodes, and/or an identification of a user and/or customer making use of these or other network 200 resources. Accordingly, the one or more network entities 210 may comprise any combination of a computer, a server computer (possibly a node acting as part of a cluster), a cluster of server computers (possibly one or more of nodes grouped together for a common purpose), unrelated individual nodes across one or more clusters with a common purpose, unrelated individual nodes across one or more clusters that generate monitored data which may be grouped together, unrelated individual nodes across one or more clusters with a common operating system, metrics reflecting resources within the network 200 used by a user, etc.

In some embodiments, the entity data 215 may be transmitted to the one or more server computers 205 running the monitor module(s) 245 via software using a publish/subscribe model, where one side publishes a message and the other, if interested, subscribes to the message flow. This means that each of the network entities 210 may publish the data 215 which contains their individual network performance metric samples 265 and the monitor module(s) 245 may subscribe to the data 215 published by these network entities 210.

In some embodiments, the publish/subscribe model may be accomplished via a message brokering software such as Apache Active MQ, as a non-limiting example. The message brokering software may route, transform, aggregate and/or store messages between applications based on message brokering rules specified in the software. In embodiments which use such software, the message brokering software may be integrated into the monitor module(s) 245. In other embodiments, the message brokering software may run independent of the monitor module(s) 245 but provide the monitor module(s) 245 access to the messages published/subscribed to.

The monitor module(s) 245 may be developed, installed and/or run on one or more servers 205 in the network 200. These modules 245 may then be configured to monitor one or more of the network nodes/entities 210, "listen" for metrics sample 265 messages published by any monitored network entities 210, receive the metrics sample 265 messages when published and apply the appropriate rules 230 to perform all necessary algorithms to calculate scores 235 and/or alerts 240 behavior, described in detail herein. The monitor module(s) 245 may receive periodic data from any node, cluster or other network entity 210 in the network 200.

The monitor module(s) 245 may calculate scores 235 and any associated alert behavior 240, as described below, based on the raw, unintelligent network entity data 215 received from the network entities 210. Thus, in addition to calculating scores 235 and/or alerts 240 for a single node, the monitoring module(s) 245 may also calculate scores 235 and/or alerts 240 for a plurality of nodes/entities 210 acting in conjunction with each other.

Because the scores 235 are calculated and alerts 240 generated and triggered within the monitoring module(s) 245 rather than on each individual node/entity 210, the monitor module(s) 245 may be configured to normalize and compare diverse information within the network entity data 215 from each of these diverse nodes/entities 210. In addition, changes or updates within configurations to calculate scores 235 and/or alerts 240 behavior from the network entity performance data 215, may be accomplished for all nodes/network entities 210 without sending updates to each individual node that uses that score 235 and/or alert 240. Likewise, changes or updates within network 200 configuration (e.g., adding, removing or repurposing a network node/cluster 210) may be accomplished for all nodes/network entities 210 without sending updates to each individual node that is affected by that network 200 configuration change.

In some embodiments, the monitor module(s) 245 may comprise an application programming interface (API) 255. The API 255 may comprise a service made available to third parties, which may further comprise any individual, entity, system, hardware, or software wishing to access the disclosed information and functionality. Such an API 255 may comprise a software-to-software interface that specifies the protocol defining how independent computer programs interact or communicate with each other. It also may comprise a collection of pre-configured building blocks allowing a third party to easily configure their software for compatibility and/or extensibility.

The API 255 may comprise any API type known in the art or developed in the future including, but not limited to, request-style, Berkeley Sockets, Transport Layer Interface (TLI), Representational State Transfer (REST), Simple Object Access Protocol (SOAP), Remote Procedure Calls (RPC) 285, Standard Query Language (SQL), file transfer, message delivery, and/or any combination thereof. The API 255 may comprise computer-readable code that, when executed, causes the API 255 to receive an RPC (i.e., function call) 285 requesting information services. Responsive to receipt of the RPC 285, the API 255 may perform the above described processes, and transmit a request results to the requesting third party.

To submit the request via an RPC 285 to the API 255, the server(s) may require authentication with the API 255. Computers or servers may locate the API 255 via an access protected URL mapped to the API 255, and may then use an API key configured to authenticate the one or more computers or servers prior to accessing the API 255.

The disclosed system components may request and receive data using requests and responses for all transfers of information through the network 200 described herein (e.g. requests/responses for published entity data 215, SOAP requests, etc.), using any data transfer request including, as non-limiting examples, any combination of web services data transfers, API function calls, HTTP response/request, SQL queries etc.

In embodiments that utilize web services, these transfers of information may be accomplished via web services data transfers. Web services may utilize a software system designed to support interoperable machine-to-machine interaction between two electronic devices over a network such as the World Wide Web by using an interface described in a machine-processable format, such as Web Services Description Language (WSDL), as a non-limiting example. These system components may interact with the web service in a manner prescribed by its description using, as one non-limiting example, SOAP messages conveyed using HTTP with an XML serialization in conjunction with other web-related standards.

In some embodiments, the monitor module(s) 245, the API 255, the server computer 205 on which they run, any web services or RPCs, and/or any other hardware or software may be configured via one or more configuration files 260 which define the behavior of the related software and/or hardware. In some embodiments, the configuration file(s) 260 may comprise XML files and may comprise any combination of configuration files and/or subdivisions of the configuration file(s) 260, possibly distinguished by XML tags, where appropriate.

As non-limiting examples, these configuration files 260 and/or subdivisions may include a configuration portion, a "message handler" portion, a scoring/scoring rules portion and an alert/alert rules portion of the configuration file(s) 260. The configuration portion of the configuration file(s) 260 may comprise: configurations to "listen" for, receive and handle the network entity data 215, including any metrics samples 265 within the data 215; a data retention policy; a system service model that contains server and client settings; and, where separate configuration files 260 are used, source paths to the message handler portion, the scoring/scoring rules portion and/or the alert/alert rules portion of the configuration file 260.

The monitoring module(s) 245 may handle the incoming network entity data 215, score the included metrics sample data 265 and/or generate and trigger alerts 240 from the scores 235 according to one or more rule sets 230 accessible to the monitor module(s) 245. In embodiments with one or more configuration files 260, these rules sets may be contained within, accessible to, or referenced by the configuration file(s) 260.

The rule sets 230 may contain various types of rules including, but not limited to: rules for extracting identifying information from the network entity data 215 to determine the metrics sample(s) 265, a sample type 225 for each sample 265 and the entities 210 the sample 265 applies to; rules for extracting individual metrics sample(s) 265 from the network entity data 215; optional rules for stripping extraneous data from the sample(s) 265 to reduce message storage requirements; rules to calculate scores 235; and rules to generate and trigger alerts 240 based on the scores 235.

These rules/rule sets 230 may be written in a general-purpose software language (e.g., C# software code, XML data elements or any combination thereof) and may be applied to any entity 210 which is represented in a sample 265. In other words, the rule sets 230 may be configurable, meaning that these configurable rules 230 may be used to create scores 235 and/or alerts 240 from that data 215 received from any entity 210 on the network, such as user, server or cluster-based rules 230.

The rules 230 for extracting and identifying information from the network entity data 215 may include one or more "message handler" functions within the monitor module(s) 245 configured to send and receive communication between the publisher and subscriber of the network entity data 215, possibly including "topics" to subscribe to and/or listen for (e.g., "endpoint.metric.hosting"). In embodiments that include a configuration file 260, the configuration file 260 may further comprise a cluster monitoring section (possibly including software code to be executed) which contains settings to subscribe to, listen for and/or identify topics within messages (e.g., Active MQ communications settings, URI, username, password, etc. as a non-limiting example)

The message received may comprise a message body containing a point-in-time sample of performance data, plus enough information to determine at least a cluster identification 250, a node identification 250 if the sample 265 is associated with a specific node, a timestamp that the sample 265 was obtained and the type 225 of sample 265 obtained.

The message handler functions may be further configured to receive, analyze and identify, within the received data 215: the network entity 210 (identified by the cluster and/or node acting as a "data sample generator" or the "external sample source" of the data); the sample of performance data; and the sample type 225 of the sample. The monitor module(s) 245 may use the identified sample type 225 to determine the rule sets 230 to be applied to the sample 265. The message handler functions may also apply optional rules for stripping extraneous data from the sample 265 to reduce message storage requirements.

The one or more samples 265, which may be contained in the performance data 215 received, may be extracted and/or examined. Samples 265 may comprise a collection of performance data that contains measurements of the data 215 for the network entity 210 (e.g. clusters, nodes and/or user data) over a specific period of time. As non-limiting examples, samples 265 may include CPU usage, CPU usage per customer, Node CPU non-idle time, CPU time required for each user on a node, memory required for each user on the node for a 1 minute time period, statistics from memory used/free, website traffic, which users have used which CPU time and how much, etc.

Various software properties and methods may be available to the monitor module(s) 245 to receive, analyze and identify samples 265. These properties and functions may utilize information identifying the associated cluster, the associated node (if applicable), the date and time the sample 265 was generated, the sample type 225, and data comprising a wrapper of the sample data (possibly in XML format), allowing access to the attributes and elements of the data as properties. As a non-limiting example, if the sample XML is <Sample ClusterId='5'><SomeValue>32.7</SomeValue></ClusterId>, then Data.ClusterId will return 5, and Data.SomeValue will return 32.7.

This wrapper of sample data, in combination with the central location of the monitor module(s) 245 and analysis of message data 215 received from the entities and comprising the sample type 225, may create flexibility in monitoring, scoring and calculating/generating alerts 240 for the nodes and entities 210 related to network performance. The sample type 225 may comprise a format for a sample that defines the data that the sample contains, and, in some embodiments, may include the fully-qualified name of the root element of the sample XML. The monitoring modules 245 may examine the message to determine the sample type 225 contained in the message. As non-limiting examples, a sample type 225 may include computer resource usage data or external webpage response times.

Any sample type 225 may be defined, since the sample type 225 contain no restriction to the type of data that can be included with a sample 265 or sample type 225. In some embodiments, the sample type 225 may contain information about the purpose of a server cluster. Different scores 235 may therefore be generated based on this purpose, and the use of different clusters, or different purposes for the clusters, creates flexibility in monitoring diverse clusters or nodes.

Additional software properties and methods (possibly software objects within the monitor module(s) 245) may take advantage of this flexibility to receive, analyze and score samples 265 across diverse entities 210 in the network. For example, the monitor modules 245 may comprise properties and methods for receiving samples 265 from individual nodes and groups of nodes on the network 200. As non-limiting examples, these properties and methods may analyze all samples 265 that have been received for and associated with identifying information 250 for a particular node or a collection of nodes and return, as non-limiting examples: sample 265 collections that contain: samples 265 of a particular type 225, samples 265 and identifying information from each of the nodes in the collection of nodes, the most recent samples 265 received from all samples 265 in a collection of nodes and/or clusters, etc.

As non-limiting examples, these samples 265 may be monitored and analyzed at the level of any of the network entities 210 such as nodes, clusters of nodes and/or users of these network resources. As non-limiting examples, at the node level, non-limiting example samples 265 may include one or more nodes': operating system; number of central processing units (CPU), percentage of CPU time used by user-mode and/or kernel mode operations across all processes; free or used physical, swap or non-paged pool memory; NIC bytes transmitted; NIC bytes transmitted/sec; NIC bytes received; NIC bytes received/sec; disk input/output (I/O) bytes written or read; disk I/O writes or reads; number of context switches; or any of the site poller metrics described below, but applied to a node level.

At the cluster level, non-limiting examples of samples 265 may include polls of sites including a site poller status (e.g., "success," "timeout," "internal_error," "dns_lookup_failure," "connection_refused"), site poller connect time, first byte time, total time and/or total bytes for various programs and operating systems with local or network disk storage.

At the user level, non-limiting examples of samples 265 may include: CPU time used by user-mode or kernel-mode operations; used memory in the non-paged pool; number of hypertext transfer protocol (HTTP) or secure HTTP (HTTPS) requests; bytes received or sent via web requests; disk I/O bytes written or read; or Disk I/O writes or reads.

Once the samples 265 are received, and the related entity 210 and sample type 225 for each sample 220 is identified, the monitor module(s) 245 may calculate and/or generate scores 235 for the sample(s) 265 for any of the entities 210 in the network 200 accessible to the monitor module(s) 245. These scores 235 may give an indication of performance or usage of the network entity 210, and may comprise a numeric value, a category that indicates how the numeric value should be interpreted, and the associated network entity 210.

Scores 235 may be applied to entities 210 other than a single node, may be generated for and applied to any entity 210 which is represented in a sample 220 and may have access to previous samples 220 for the cluster and node. Because the monitor module(s) 245 have access to samples 265 from all network entities 210, greater flexibility is available for the generation and application of the scores 235 for each of these network entities 210 than would be available if each entity 210 determined its own scores. As non-limiting examples, the score 235 may be applied to the entire cluster or may be applied to a specific user across any or all nodes in a cluster, as non-limiting examples.

The sample type 225 for each received sample 265 may determine the scoring and/or alert 240 rule(s) 230 for the sample 265. These scoring rules 230 may be determined by one or more rule sets for scoring 230, which may ultimately determine the scores 235 assigned to the metrics 265. Because of the flexibility available to the scoring rules 230 as outlined above: a single rule 230 may generate any number of scores 235, one or more rules may use samples 265 of different sample types 225 in generating the scores 235 and/or one or more rules may generate different categories of scores 235 based on any and all information included in the various samples 265. As a non-limiting example, if one of the samples 265 for a cluster contains operating system information or cluster purpose, a scoring rule within the rule sets 230 may use that information or purpose to generate scores 235 that only apply to that operation system or purpose. Similarly, if a single cluster or node has very specific scoring needs, a rule 230 may use the cluster or node identifiers 250 to determine scoring behavior.

The monitor module(s) 245 may calculate and generate the scores 235 according to a scoring script, possibly written in a general purpose language such as C# within XML. In embodiments that use a configuration file 260, the configuration file 260 may include and/or call rules 230 and/or functions to execute such software code to determine scores 235 for network entities 210 identified in relation to the sample(s) 265. As a non-limiting example, a "Score" software object within the monitor module(s) 245 may represent a score 235 generated by a scoring rule 230. An instance of this Score object may identify the associated network entity 210, the score category, the numeric value of the score 235 and/or a list of string name-value pairs that may be used to associate additional information with the score 235. For example, if a score 235 represented the sum of the CPU percentage of the top 3 users on a node, the following code may include the identification of the top 3 users as supporting data: var top3CpuPercentScore=new Score(ScoreOwnerType.Node, nodeId, "Top 3 Users CPU %", top3CpuPercent, "UserId", userId1, "UserId", userId2, "UserId", userId3).

A scoring rule 230 may likewise comprise a "ScoringRules" software object, possibly invoked by the "message handler" functions disclosed above. In embodiments which include one or more configuration files 260, the scoring script(s) may be included in a scoring section of the message handler configurations and functions. As a non-limiting example, a ScoringRules software object may have a method with the following signature: IEnumerable<Score> GetScores(SampleView sample, ClusterDataView clusterData), where "sample" contains the data 215 of a just-received sample 265, and "clusterData" contains data 215 for a target cluster.

Like the samples 265 described above, scores 235 and/or score rules 230 may be broken down by cluster, node or user. At the cluster level, non-limiting example scores 235 and/or score rules 230 may include the difference (in percent) in connection count between the top 2 nodes in the cluster; average CPU usage (in percent) across all nodes for the past minute; and physical memory (in bytes) used or free across all nodes in the cluster.

At the node level, non-limiting examples of scores 235 and/or score rules 230 may include time (in minutes) since the most recent resource metrics sample 265; average CPU usage (in percent) for the past minute, 10 minutes etc.; estimated average number of simultaneous in-bound HTTP and HTTPS connections over a 1 minute period; physical (in bytes) or virtual (physical+swap–in bytes) memory used or free on the node; percent of total physical or virtual memory that is in use on the node; The memory (in bytes) used by the 'iissvcs' svchost or 'inetinfo.exe' processes; average rate (in bytes/sec) of network usage (transmit+receive) on the node in the past minute; lowest, average or highest filer ping time (in milliseconds) in the past minute; and the number of attempted and/or successful pings in the past minute.

At the user level, non-limiting example scores 235 and/or score rules 230 may include the amount of CPU (in seconds and/or percent) consumed by the user's processes for the past minute, 10 minutes, etc. across a single node and/or all nodes, possibly as a percent of the total CPU time available; estimated average number of simultaneous in-bound HTTP and HTTPS connections to the user's sites on a single node; average amount of CPU time (in seconds) consumed by user processes per HTTP or HTTPS connection; ratio of data read from disk by user processes to data returned over HTTP or HTTPS connection; number of HTTP and/or HTTPS connections received by the user's processes across all nodes in the past minute; amount of data (in bytes) sent and/or received by HTTP(S) connections to the user's processes across all nodes in the past minute; amount of data (I/O in bytes) read from, written to or transmitted via other (i.e. not read or write) operations to or from the local disk or filer by the user's processes on the node in the past minute; number of read, write or other (i.e. not read or write) operations (I/O in bytes) from the local disk or filer by the user's processes on the node in the past minute; number of threads, handles and/or physical and/or virtual memory used by the user's processes on the node in the past minute.

The score category included as a part of each score 235 may indicate how the numeric value in the score 235 should be interpreted, and may be used for purposes of generating and triggering one or more alerts 240.

Figure 3:
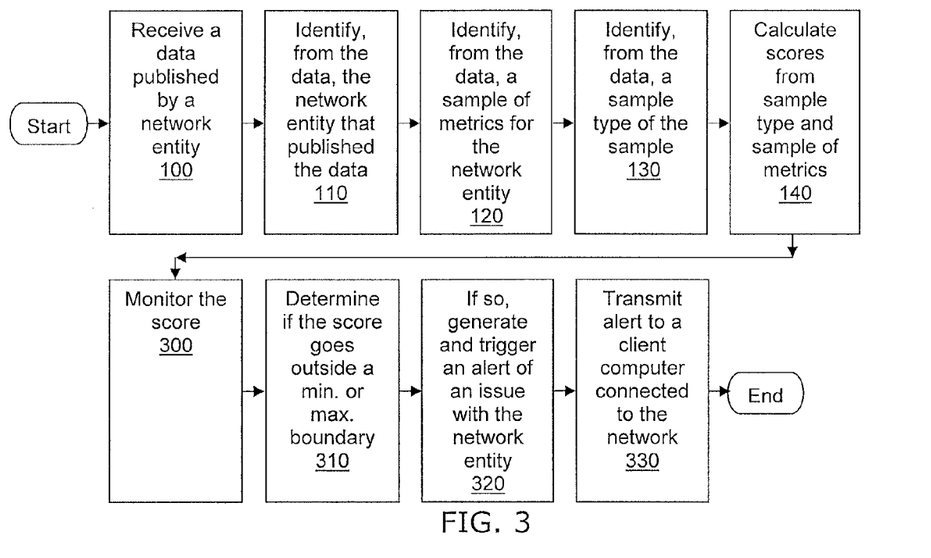
FIG. 3 is a flow diagram illustrating a possible embodiment of a method for monitoring one or more network entities using a central monitoring system.

FIG. 3 illustrates that the method for monitoring one or more network entities using a central monitoring system disclosed in FIG. 1 may further comprise the steps of the server(s) 205 monitoring the network resource usage score(s) 235 (Step 300), determining whether the score(s) 235 go out of a minimum or maximum boundary for a specified period of time (Step 310), and if so, generating and triggering an alert 240 indicating a detected issue with the network entity 210 (Step 320). The server(s) 210 may then transmit the alert 240 to a client computer 275 communicatively coupled to the network 200 (Step 330).

Alerts 240 may indicate a detected issue with a network entity 210 and may be triggered within the monitor module(s) 245 by a specific score 235 when the score goes out-of-range of a minimum and/or maximum boundary for the score 235 for a specified period of time. The period of time that the score 235 must be "out-of-bounds" before the alert 240 is triggered may indicate to the monitor module(s) 245 that action needs to be taken to resolve a detected issue with the one or more specific network entities 210. Alerts 240 may identify, from the network entity data 215, a type of entity 210 or a score category that the alert 240 applies to, so that the monitor module(s) 245 may take action based on the type of entity, sample type 225 and/or score category identified.

In addition, alerts 240 may also review metrics 265 and previous alerts 240 for a period of time to determine if there is a pattern to the behavior and relate the data set back to the offending network entity 210. The specific period of time may include metrics 265 checked, for example, over the last hour, or over a set of minutes, etc. for alerts 240. This data may be analyzed to determine if there is a pattern of behavior and the relevant rules 230 may be applied accordingly. As non-limiting examples, alerts 240 may identify a bad performing cluster arrangement for a server cluster or an individual server.

Each of the alert rules 230 may comprise: a unique name for the alert 240 that identifies the alert rule 230; an owner type of the score 235 that triggers the alert 240 (e.g., "cluster," "node," "user," etc.) that owns the score 235 that the alert 240 is triggered by; a score category that triggers the alert category of the score 235 that the alert 240 is triggered by; an optional minimum acceptable value of the score lower bound of the acceptable range of the score 235 (If this is not specified, there is no lower bound, and the alert will only be triggered when the score 235 exceeds the upper bound of the acceptable range); an optional maximum acceptable value of the score upper bound of the acceptable range of the score 235 (If this is not specified, there is no upper bound, and the alert will only be triggered when the score 235 is below the lower bound of the acceptable range); a total amount of time the score 235 can be out of range before the alert 240 is triggered; a period of time over which the out-of-range time is calculated before the alert 240 is triggered; and the severity of the alert (e.g., critical, major, minor, info)

As a non-limiting example, an alert 240 may be thrown for an alert rule 230 named "Node Not Reporting." This alert rule 230 may target individual nodes and may be triggered based on a score 235 for a most recent sample 220 age. The alert rules 230 may cause this alert 240 to be triggered in this example if the resource metrics 220 for the node have not been received in at least 5 minutes. If such an alert 240 is triggered, the alert rules 230 may be configured to assign an alert severity of "Major" to this alert 240.

In embodiments which use one or more configuration files 260, the alert rules 230 may be defined through an alert rules 230 configuration file or an alert rules 230 section of a configuration file 260. As a non-limiting example, The rules 230 for generating alerts 240 based on scores 235 may comprise a collection of XML alert rules objects, primarily used for SNMP messages associated with the alert. For example, an XML alert rule object may appear as follows: <AlertRules><add Name='High Cluster CPU' ScoreOwnerType='Cluster' ScoreCategory='CPU %' MaxValue='90' AllowedOutOfRangeTime='00:05' AllowedOutOfRangeWindow='00:30' Severity='Major'/> </AlertRules>

As with samples 265 and scores 235, the centralized nature of the monitor module(s) 245 within the network 200 circumvents the need to configure each individual entity 210 for alerts 240. This creates flexibility in their application within the system because alerts 240 are triggered and take action in a centralized software based on entity type and score category. Thus, if specific entities 210 require different alert rules 230, the score rules 230 and/or alert rules 230 may be set up to provide special handling for only those entities 210 that are exceptional.

The monitor module(s) 245 and/or API 255 may include an interface to send messages to external systems when an alert 240 is triggered. This external system may comprise a "response engine" 280 that may examine alerts 240 transmitted from the monitor module(s) 245 and make recommendations on "actions" to be taken to correct an alert 240. Users may select either the recommended action or another action to run through the interface. Actions may include automated steps taken against a cluster or node, such as "kill user processes on node 123." Actions performed repeatedly which are easily automatable may be simplified to a simple click in the interface.

The response engine 280 may process alerts 240 which determine what actions can be run in response to an alert 240. The response engine may also provide a list of all available actions for a cluster, node or user that is currently affected by an alert 240 to take other or additional actions in response to the alert 240. The list of available actions may comprise the following information: network entities 210 that are currently alerting; cluster information for any cluster, node or user; recommended actions based on alerts 240; and a list of available actions for all clusters, nodes and users.

In some embodiments, the score(s) 235 may be transmitted to a client computer 275 in response to a data request from the client computer 275. The monitor module(s) 245 and/or API 255 may include an interface to return sample 265, score 235 and/or alert 240 data to external systems (e.g. a user interface monitored by system administrators) in response to requests from those systems. The modules 245 may include a data request handler to handle these requests. The monitor module(s) 245 and/or API 255 may include a web service that exposes a SOAP interface that allows access to the generated scores 235 and alerts 240, as well as the samples 265. The SOAP interface 285 may send requests that: receive the samples 265, scores 235 and/or alerts 240 associated with a cluster; gets all clusters that have active alerts 240; gets the identifications associated with all clusters that are currently monitored; gets the clusters with the highest scores 235 of the specified type.

The SOAP interface 285 may utilize SOAP, a protocol specification for exchanging structured information in the implementation of web services in computer networks, which may consist of three parts: an envelope, which defines what is in the message and how to process it, a set of encoding rules for expressing instances of application-defined data types, and a convention for representing procedure calls and responses The web service may be accessible via a WSDL interface. This XML-based interface description language may be used for describing the functionality offered by a web service. A WSDL description of a web service (also referred to as a WSDL file) may provide a machine-readable description of how the service can be called, what parameters it expects, and what data structures it returns.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising the steps of:
subscribing, by a single instance of a network monitoring software running on a server computer coupled to a network, to at least one topic defining a common purpose for a server cluster comprising a plurality of servers configured according to a diversity of configuration settings;
decoding, by the server computer, an extensible markup language (XML) file published via data stream by at least one server in the plurality of servers, the XML file comprising:
a server identification for the at least one server that published the XML file;
a numeric value representing sample of performance metric, which has not been analyzed, or on which no algorithms have been performed, by the at least one server; and
a sample type of the at least one sample, the sample type comprising a definition of the common purpose for the server cluster;
normalizing, by the server computer, the numeric value according to the diversity of configuration settings among the cluster;
calculating, by the server computer, according to at least one scoring rule for the sample type, as defined in an XML configuration file, score comprising the numeric value as normalized;
rendering, by the server computer, a user interface comprising the score;
responsive to a determination that the score is outside a minimum or maximum boundary for a specified period of time, as defined for the sample type in at least one alert rule in the XML configuration file, rendering, by the server computer, on the user interface, an alert comprising:
the server identification for the server that scored outside the minimum or maximum boundary;
the score, including a score interpretation; and
a recommended action to resolve a cause of the alert, as defined for the sample type within at least one recommendation rule in the XML configuration file; and
transmit the user interface to a client computer coupled to the network.

2. The method of claim 1, wherein the XML file further comprises:
an identity of the at least one server; and
a data feed of the sample, wherein the at least one server has run no calculations on the sample or the metric.

3. The method of claim 1, wherein the at least one server comprises:
a network node comprising a computer or an other server computer;
a server cluster comprising a plurality of network nodes;

a plurality of unrelated network nodes across one or more server clusters acting with the common purpose;
a plurality of unrelated network nodes across one or more server clusters generating a plurality of data that can be grouped together;
a plurality of unrelated network nodes across one or more server clusters with a common operating system; or
at least one metric reflecting usage of the at least one server by a user.

4. The method of claim 1, wherein the XML file is published via a message broker software utilizing a publish/subscribe model, wherein:
the at least one server publishes the sample of the metric as a message topic;
the server computer is configured to subscribe to the message topic and receive:
an identity of the at least one server that published the data;
the sample of the metric; and
the sample type for the sample.

5. The method of claim 1, wherein the XML configuration file controls:
extraction of a plurality of identifying information from the XML file, to determine:
the server computer the sample applies to;
the sample; and
the sample type;
calculation of at least one network resource usage score;
generation of the alert based on the at least one network resource usage score; or
extraction of the sample from the XML file.

6. The method of claim 1, wherein the XML configuration file:
is written using a general-purpose language;
is applicable to any entity which is represented in a sample; and
has access to at least one previous sample for the at least one server.

7. The method of claim 1, wherein the sample comprises a collection of data containing at least one measurement of data for the at least one server over the specific period of time.

8. The method of claim 1, wherein the sample type:
comprises a format for the sample, the format defining a plurality of data that the sample contains; and
determines the at least one scoring rule applied to the sample.

9. The method of claim 1, wherein the sample type:
comprises information about a purpose of the at least one server; and
determines, based on the purpose of the at least one server, the at least one scoring rule applied when calculating at least one network resource usage score.

10. The method of claim 1, wherein at least one network resource usage score:
measures a metric performance or a usage of the at least one server; and
comprises:
the numeric value;
a category defining how the numeric value should be interpreted; and
the at least one server associated with the category and the at least one network resource usage score.

11. The method of claim 1, wherein the XML configuration file controls:
generation of a plurality of scores;
generation of the plurality of scores using a plurality of samples comprising a plurality of different sample types; or
generation of one or more different categories of scores based on information included in the plurality of samples.

12. The method of claim 1, wherein at least one network resource usage score:
is calculated for a plurality of network nodes;
is calculated for at least one cluster of network nodes; or
is calculated for at least one user of the plurality of network nodes.

13. The method of claim 1, wherein at least one network resource usage score:
is calculated using at least one scoring script running on the server computer; and
is calculated using:
the XML file published by the at least one server; and
an additional data published by an additional network entity.

14. The method of claim 1, further comprising the steps of:
monitoring, by the server computer, at least one network resource usage score;
determining, by the server computer, whether the at least one network resource usage score is outside the minimum or maximum boundary for a specified period of time;
responsive to a determination that the at least one network resource usage score is outside the minimum or maximum boundary for the specified period of time, generating and triggering, by the server computer, the alert indicating a detected issue with the at least one server; and
transmitting, by the server computer, the alert to the client computer communicatively coupled to the network.

15. The method of claim 1, wherein the score triggers the alert indicating a detected issue with the at least one server, the alert being triggered based on:
an entity type the alert applies to; and
a score category the alert applies to.

16. A system, comprising a single instance of a network monitoring software running on a server computer communicatively coupled to a network and configured to:
subscribe to at least one topic defining a common purpose for a server cluster comprising a plurality of servers configured according to a diversity of configuration settings;
decoding, by the server computer, an extensible markup language (XML) file published via data stream by at least one server in the plurality of servers, the XML file comprising:
a server identification for the at least one server that published the XML file;
a numeric value representing sample of performance metric, which has not been analyzed, or on which no algorithms have been performed, by the at least one server; and
a sample type of the at least one sample, the sample type comprising a definition of the common purpose for the server cluster; and
normalize the numeric value according to the diversity of configuration settings among the cluster;
calculate, according to at least one scoring rule for the sample type, as defined in an XML configuration file, a score comprising the numeric value as normalized;

render a user interface comprising the score;
responsive to a determination that the score is outside a minimum or maximum boundary for a specified period of time, as defined for the sample type in at least one alert rule in the XML configuration file, render, on the user interface, an alert comprising:
   the server identification for the server that scored outside the minimum or maximum boundary;
   the score, including a score interpretation; and
   a recommended action to resolve a cause of the alert, as defined for the sample type within at least one recommendation rule in the XML configuration file; and
transmit the user interface to a client computer coupled to the network.

17. The system of claim 16, wherein the single instance of the network monitoring software is configured to:
   normalize and compare a data between a plurality of nodes in the network;
   determine if at least one network resource usage score is outside a minimum or maximum boundary for a specified period of time;
   responsive to a determination that the at least one network resource usage score is outside the minimum or maximum boundary for the specified period of time, generate and trigger the alert indicating a detected issue.

18. The system of claim 17, wherein the single instance of the network monitoring software comprises:
   an application programming interface running on the server computer;
   at least one web service; or
   the XML configuration file defining the behavior of the server computer or the single instance of the network monitoring software, the XML configuration file comprising configurations to:
      subscribe to at least one message topic;
      receive the sample of the metric;
      calculate the score;
      determine if at least one network resource usage score is outside the minimum or maximum boundary for the specified period of time; and
      responsive to a determination that the at least one network resource usage score is outside the minimum or maximum boundary for the specified period of time, generate and trigger the alert indicating a detected issue.

19. The system of claim 17, further comprising a response engine configured to:
   receive the alert indicating the detected issue; and
   generate at least one available action to be taken to correct the alert.

* * * * *